(12) United States Patent
Phillips (10) Patent No.: US 11,754,138 B2
(45) Date of Patent: Sep. 12, 2023

(54) GAS SPRING END MEMBERS AS WELL AS GAS SPRING ASSEMBLIES INCLUDING SAME

(71) Applicant: Firestone Industrial Products Company, LLC, Nashville, TN (US)

(72) Inventor: Albert S. Phillips, Gallatin, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 17/915,399

(22) PCT Filed: Mar. 29, 2021

(86) PCT No.: PCT/US2021/024556
§ 371 (c)(1),
(2) Date: Sep. 28, 2022

(87) PCT Pub. No.: WO2021/202323
PCT Pub. Date: Oct. 7, 2021

(65) Prior Publication Data
US 2023/0120085 A1  Apr. 20, 2023

Related U.S. Application Data

(60) Provisional application No. 63/002,441, filed on Mar. 31, 2020.

(51) Int. Cl.
*F16F 9/04* (2006.01)
*B60G 11/27* (2006.01)
(Continued)

(52) U.S. Cl.
CPC ............ *F16F 9/0454* (2013.01); *B60G 11/27* (2013.01); *B60G 11/28* (2013.01); *F16F 9/05* (2013.01);
(Continued)

(58) Field of Classification Search
CPC .......... F16F 9/0454; F16F 9/05; F16F 9/3292; B60G 11/27; B60G 11/28; B60G 2204/126; B60G 2202/152
See application file for complete search history.

(56) References Cited

U.S. PATENT DOCUMENTS 5,941,509 A    8/1999  Avesian et al.
9,039,020 B2 *  5/2015  Ratz .......................... F16F 9/05
                                                         267/64.19
(Continued)

FOREIGN PATENT DOCUMENTS

DE    102017004115 A1   10/2018

OTHER PUBLICATIONS

International Search Report and Written Opinion dated Jun. 21, 2021 issued by EPO in connection with corresponding International Application No. PCT/US2021/024556.

*Primary Examiner* — Pamela Rodriguez
(74) *Attorney, Agent, or Firm* — Thomas R. Kingsbury; Matthew P. Dugan (57) ABSTRACT

Gas spring end members include an end member wall with a longitudinal axis. The end member wall includes an end wall portion and an outer wall portion. The outer wall portion extends peripherally about an axis and is dimensioned to receivingly engage a flexible spring member. Rib wall portions are spaced around the axis with each of the rib wall portions projecting axially from the end wall portion toward a rib end surface portion. The rib wall portions also include a rib edge surface portion spaced inward from an inner side surface portion of the outer peripheral wall portion such that a gap is formed therebetween. Gas spring assemblies including one or more of such end members, and suspension systems including one or more of such gas spring assemblies are also included.

20 Claims, 6 Drawing Sheets

(51) Int. Cl.
*B60G 11/28* (2006.01)
*F16F 9/05* (2006.01)

(52) U.S. Cl.
CPC .. *B60G 2204/126* (2013.01); *B60G 2300/042* (2013.01)

(56) References Cited

U.S. PATENT DOCUMENTS

| | | | |
|---|---|---|---|
| 9,541,150 B2 | 1/2017 | Debruler | |
| 9,555,817 B2 | 1/2017 | Jackson, Jr. | |
| 2005/0236749 A1* | 10/2005 | Gross | F16F 9/0454 267/122 |
| 2009/0278289 A1* | 11/2009 | Gawinski | B60G 13/10 267/64.27 |
| 2015/0224844 A1 | 8/2015 | Ratz et al. | |
| 2018/0297431 A1* | 10/2018 | Leonard | F16F 9/0454 |

\* cited by examiner

GAS SPRING END MEMBERS AS WELL AS GAS SPRING ASSEMBLIES INCLUDING SAME

This application is the National Stage of International Application No. PCT/US2021/024556, filed on Mar. 29, 2021, which claims the benefit of priority from U.S. Provisional Patent Application No. 63/002,441, filed on Mar. 31, 2020, the entire contents of which is hereby incorporated herein by reference.

BACKGROUND

The subject matter of the present disclosure broadly relates to the art of gas spring devices and, more particularly, to gas spring end members adapted to distribute both axial and radial loads experienced during assembly and/or use. Gas spring assemblies including one or more of such gas spring end members are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as an operator cab or body, for example, and an unsprung mass, such as a vehicle frame, an axle or other wheel-engaging members, for example, with a suspension system disposed therebetween. Typically, a suspension system will include one or more spring devices as well as one or more damping devices that together permit sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the one or more spring devices function to accommodate forces and loads associated with the operation and use of the vehicle. The one or more damping devices are operative to dissipate energy associated with undesired inputs and movements of the sprung mass, such as road inputs occurring under dynamic operation of a vehicle, for example. Typically, such dampers are liquid filled and operatively connected between a sprung mass and an unsprung mass, such as between a body and a frame or axle of a vehicle, for example. One example of such damping components are conventional shock absorbers that are commonly used in vehicle suspension systems.

In some cases, the one or more spring devices can take the form of gas spring assemblies that utilize pressurized gas as the working medium. Gas spring assemblies of various types, kinds and constructions are well known and commonly used. Typical gas spring assemblies can include a flexible wall that is secured between comparatively rigid end members. A wide variety of arrangements for securing the flexible wall on or along an end member have been developed, and it is recognized that different securing arrangements have different advantages, such as low cost, improved sealing or reliability, high strength and/or a capability of disassembly and/or repair, for example. Thus, different securing arrangements may be employed in different applications depending upon the particular conditions under which the gas spring assembly is intended for use, such as applications during which elevated internal gas pressures, over-extension conditions and/or exposure to low temperatures may be experienced. In many cases, a different securing arrangement may be selected and used on each of the two different end members of a gas spring assembly.

For example, some gas spring constructions utilize a crimp ring to secure an end of the flexible wall along an outer surface of the end member. In such cases, the crimp ring may take the form of an endless, annular ring that is deformed inwardly to compress the flexible wall against the outer surface of the end member. Unfortunately, such assembly techniques can result in variations in compression of the flexible wall around the outer surface of the end member. It has been recognized that under certain conditions of use, such as when experiencing certain axial load conditions, for example, additional flexing of the end member can occur. When combined with areas of reduced compression, the additional flexing of the end member can result in pressurized gas loss or other undesirable performance characteristics.

Notwithstanding the overall success of known constructions, it is believed desirable to develop end members for gas spring assemblies that may assist in providing improved retention and/or securement of the flexible wall, and/or overcoming other disadvantages of known constructions, while promoting relatively low costs of manufacture, ease of assembly and/or otherwise advancing the art of gas spring devices.

BRIEF DESCRIPTION

One example of a gas spring end member in accordance with the subject matter of the present disclosure can be dimensioned for securement to an associated flexible spring member. The gas spring end member can include an end member wall with a longitudinal axis. The end member wall can include an end wall portion oriented transverse to the longitudinal axis and an outer wall portion disposed radially outward of the end wall portion. The outer wall portion can extend peripherally about the longitudinal axis and can be dimensioned to receivingly engage the associated flexible spring member. The outer wall portion can include a first end surface portion and a second end surface portion facing opposite the first end surface portion with an inner side surface portion of the outer wall portion facing radially inward. A plurality of rib wall portions can be disposed in spaced relation to one another about the longitudinal axis with each of the plurality of rib wall portions projecting axially from the end wall portion toward a rib end surface portion oriented transverse to the longitudinal axis. The plurality of rib wall portions can also include a rib edge surface portion spaced inward from the inner side surface portion of the outer wall portion such that a gap is formed therebetween.

One example of a gas spring assembly in accordance with the subject matter of the present disclosure can include a flexible spring member extending peripherally about a longitudinal axis and longitudinally between opposing first and second ends such that a spring chamber is at least partially defined therebetween. A gas spring end member according to the foregoing paragraph is at least partially received within the first end of the flexible spring member. A crimp ring can be positioned coextensively with the gas spring end member and can extend peripherally therearound with the first end of the flexible spring member extending coextensively between the crimp ring and the gas spring end member such that a substantially fluid-tight connection is formed therebetween.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of the spring chamber.

DETAILED DESCRIPTION

Turning now to the drawings, it is to be understood that the showings are for purposes of illustrating examples of the subject matter of the present disclosure and that such examples are not intended to be limiting. Additionally, it will be appreciated that the drawings are not to scale and that portions of certain features and/or elements may be exaggerated for purposes of clarity and/or ease of understanding.

Figure 1:
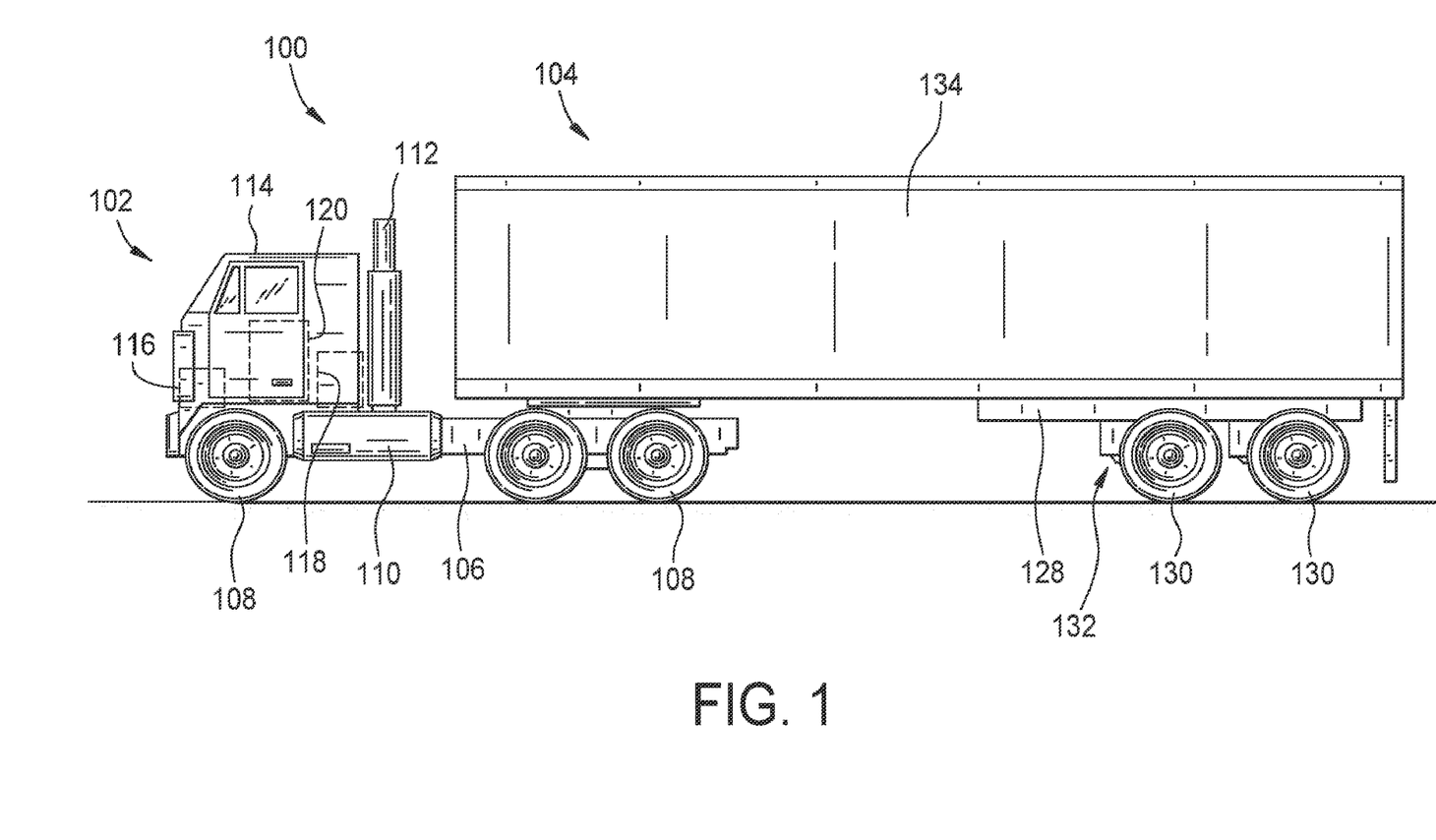
FIG. 1 is a graphical representation of one example of a vehicle including a gas spring assembly in accordance with the subject matter of the present disclosure.
Figure 2:
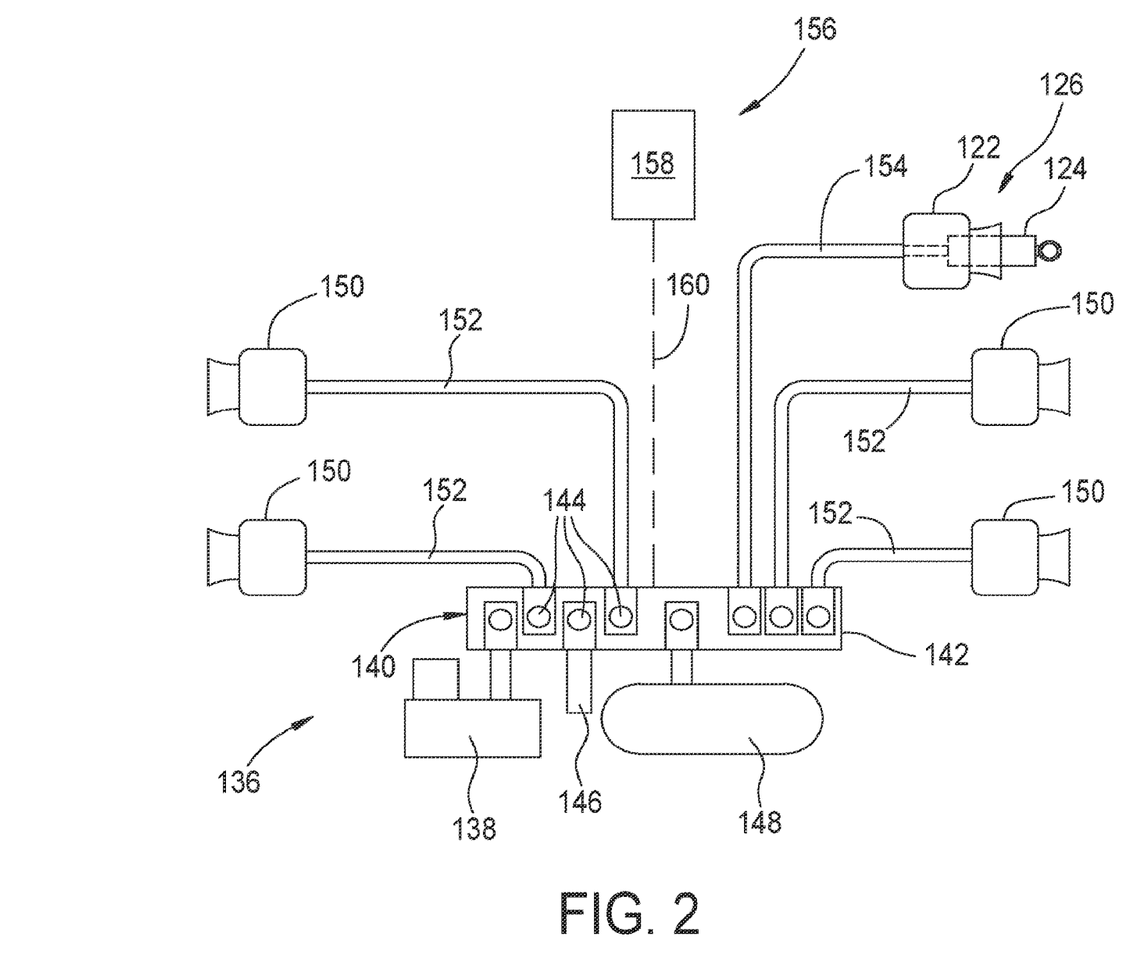
FIG. 2 is a greatly simplified schematic representation of one example of a pressurized gas system including a gas spring assembly in accordance with the subject matter of the present disclosure.

With reference to FIGS. 1 and 2, a vehicle 100 is shown as taking the form of a tractor-trailer combination that includes an over-the-road tractor 102 and a trailer 104 that is operatively connected to the tractor for over-the-road transport. Tractor 102 is shown as including a frame 106 that is supported on a plurality of wheels 108 by a tractor suspension system (not shown). Tractor 102 will typically also include an internal combustion engine (not shown) and drivetrain (not shown) that are supported on the frame and provide motive power to one or more of wheels 108. Tractor 102 can include a fuel tank 110 and an exhaust stack 112 that are operatively associated with the engine.

Tractor 102 can also include an operator compartment or cab 114 that can be supported on or along frame 106 in any suitable manner, such as by way of one or more cab mounts and/or one or more cab suspensions, which are respectively represented in FIG. 1 by dashed boxes 116 and 118. Additionally, or in the alternative, Tractor 102 can, optionally, include a seat suspension, which is represented in FIG. 1 by dashed box 120. It will be appreciated that a cab, such as cab 114, for example, will typically be supported on or along frame 106 by one or more of cab mounts 116, one or more cab suspensions 118 and/or one or more seat suspensions 120. If included, such one or more cab suspensions and/or seat suspensions can include one or more gas spring assemblies 122 and/or one or more dampers 124 that can be operatively connected on, along or otherwise frame 106 and a corresponding one of cab 114 and/or a seat (not shown) within the cab in any suitable manner.

It will be recognized that gas spring assemblies 122 are illustrated in FIGS. 1 and 2 as being of a rolling lobe-type construction. It is to be understood, however, that gas spring assemblies 122 could be of any other type, kind and/or construction. Additionally, it will be appreciated that dampers 124 are shown and described herein as having a conventional construction in which a hydraulic fluid is contained within at least a portion thereof. However, it will be recognized and appreciated that dampers of other types, kinds and/or constructions, such as pressurized gas or "air" dampers, for example, could be used without departing from the subject matter of the present disclosure. In some cases, the gas spring assembly and the damper can be secured together in an axially co-extensive arrangement to form a gas spring and damper assembly 126 that is operatively secured between the frame and the cab and/or seat of the tractor. In other cases, the gas spring assembly can be operatively secured between frame 106 and cab 114 and/or the seat in spaced relation to and/or otherwise separate from the damper.

Trailer 104 is shown as including a frame 128 that is supported on a plurality of wheels 130 by a trailer suspension system 132. Trailer 104 can also include a trailer body 134 that is at least partially supported on frame 128 and is generally dimensioned to receive and retain a quantity of cargo.

It will be appreciated that numerous components and/or systems of vehicle 100 can utilize pressurized gas (e.g., air) as a power source for the operation thereof. As non-limiting examples, such components and/or systems can include a tractor suspension system, a tractor braking system, a cab suspension, a trailer suspension system and/or a trailer braking system. One greatly-simplified example of a pressurized gas system 136 that can be operatively associated with one or more of the components and/or systems of vehicle 100 is shown in FIG. 2. Pressurized gas system 136 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 136 includes a pressurized gas source 138, such as a compressor, for example, for generating pressurized air or other gases. A control device 140, such as a valve assembly, for example, is shown as being in communication with pressurized gas source 138 and can be of any suitable configuration or arrangement. In the exemplary embodiment shown, control device 140 can include a valve assembly with a valve block 142 and a plurality of valves 144 supported thereon. Control device 140 can also, optionally, include a suitable exhaust 146, such as a muffler, for example, for venting pressurized gas from the system. Pressurized gas system 136 can also, optionally, include a reservoir 148, which is shown as being in fluid communication with the pressurized gas source and/or the control device, and is suitable for storing pressurized gas at an elevated pressure for an extended period of time, such as minutes, hours, days, weeks or months.

In some cases, the tractor suspension system and/or the trailer suspension system can include one or more gas spring assemblies 150, which can be of a conventional construction. In the arrangement shown in FIG. 2, control device 140 is in communication with gas spring assemblies 150 through gas transfer lines 152. As such, pressurized gas can be selectively transferred into and/or out of the gas spring assemblies through control device 140, such as by selectively operating valves 144, for example. Pressurized gas system 136 can also be operatively associated with one or more other components and/or systems, such as gas spring assemblies and/or actuators operatively associated with one or more other suspension systems, for example. As a non-limiting example, pressurized gas system 136 can be operatively associated with gas spring assemblies 122 in a suitable manner such as may provide for selective operation and/or control thereof. As shown in FIG. 2, control device 140 is in fluid communication with gas spring assembly 122 through a gas transfer line 154, which is operatively associated with one of valves 144 such that pressurized gas can be selectively transferred into and/or out of gas spring assembly 122 and/or any other actuators and/or other components of vehicle 100.

As indicated above, it will be appreciated that pressurized gas system 136 is greatly simplified and merely illustrates one example of a pressurized gas system with which gas spring assemblies in accordance with the subject matter of the present disclosure can be used. As such, it will be appreciated that the pressurized gas system can include any one or more additional systems and/or components. For example, in some cases, pressurized gas system 136 can include a control system 156 that is capable of communication with any one or more systems and/or components of vehicle 100, such as for selective operation and/or control thereof. Control system 156 can include a controller or electronic control unit (ECU) 158 communicatively coupled with pressurized gas source 138 and/or control device 140, such as through a conductor or lead 160, for example, for selective operation and control thereof, which can include supplying and exhausting pressurized gas to and/or from the gas spring assemblies 122 and/or 150 of suspension systems 118 and/or 132, respectively. It will be appreciated that controller 158 can be of any suitable type, kind and/or configuration.

Having described an example of a suspension system (e.g., cab suspension system 118) that can include one or more gas spring assemblies in accordance with the subject matter of the present disclosure, one example of such a gas spring assembly 200 will now be described in connection with FIGS. 3-6. As shown therein, gas spring assembly 200, such as may be suitable for use as one or more of gas spring assemblies 122 in FIGS. 1 and 2, for example, is shown as having a longitudinal axis AX (FIG. 6) and can include one or more end members, such as an end member 202 and an end member 204 that is spaced longitudinally from end member 202. A flexible spring member 206 can extend peripherally around axis AX and longitudinally between an end 208 and an end 210 with a spring chamber 212 at least partially defined by flexible spring member 206 between ends 208 and 210.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. It will be appreciated that any suitable combination and/or arrangement of securement devices can be used to operatively connect the end members with respective ones of the sprung and unsprung masses. For example, end member 202 can be secured along a first or upper structural component USC, such as cab 114 in FIG. 1, for example, by way of a securement device 214, such as a threaded nut, for example, that can operatively engage a securement device 216, such as threaded stud, for example, disposed on or along end member 202. Additionally, one of securement devices 214 and 216 can extend through mounting holes (not shown) in upper structural component USC for operative engagement with the other of securement devices 214 and 216. Additionally, or in the alternative, securement device 216 can take the form of a threaded hole with securement device 214 taking the form of a threaded fastener that extends into engagement with the threaded hole, such as through a mounting hole (not shown) in the upper structural component. In some cases, such a threaded hole can be at least partially formed by a corresponding threaded fitting that can be at least partially embedded in or otherwise retained on or along the end member.

End member 204 can be secured along a second or lower structural component LSC, such as a frame 106 in FIG. 1, for example, in any suitable manner. As one example, lower structural component LSC could include one or more mounting holes (not shown) extending therethrough. In such case, a threaded fastener 218 could extend through one of the mounting holes and be operatively connected to end member 204, such as by engaging a corresponding threaded fitting (not shown) that may be at least partially embedded in or otherwise retained on or along the end member.

Additionally, a fluid communication port, such as a transfer passage 220, for example, can be provided to permit fluid communication with spring chamber 208, such as may be used for transferring pressurized gas into and/or out of the spring chamber, for example. In the exemplary arrangement shown in FIGS. 3-6, transfer passage 220 extends through securement device 216 and through end member 202 into fluid communication with spring chamber 208. It will be appreciated, however, that any other suitable fluid communication arrangement could alternately be used.

It will be appreciated that the one or more end members 202 and/or 204 can be operatively connected or otherwise secured to flexible spring member 206 in any manner suitable for forming a substantially fluid-tight seal and/or connection therebetween. In the exemplary arrangement shown in FIG. 3, end member 202 is of a type commonly referred to as a top cap or top plate and is secured to end 208 of flexible spring member 206 by way of a retaining ring 222 that can be crimped or otherwise inwardly deformed to compressively capture at least a portion of end 208 of flexible spring member 206 between the end member and the retaining ring. In such case, retaining ring 222 is positioned coextensively with end member 202, and end 208 extends coextensively with and radially between the retaining ring and the end member. In an installed condition, retaining ring 222 compressively engages end 208 of the flexible spring member in abutting engagement with end member 202 such that a substantially fluid-tight seal and/or connection is formed therebetween.

Figure 3:
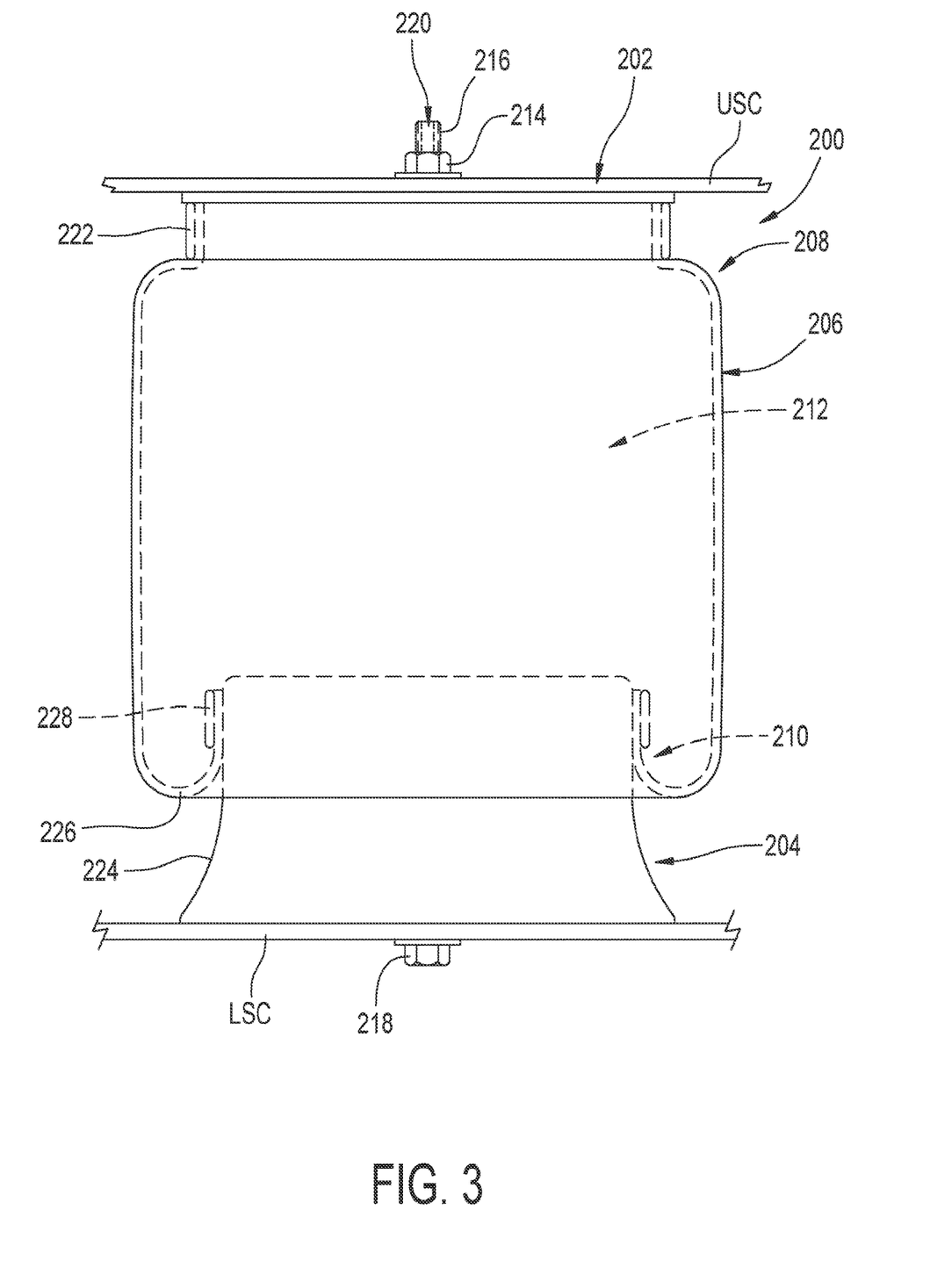
FIG. 3 is side elevation view of one example of a gas spring assembly in accordance with the subject matter of the present disclosure.
Figure 4:
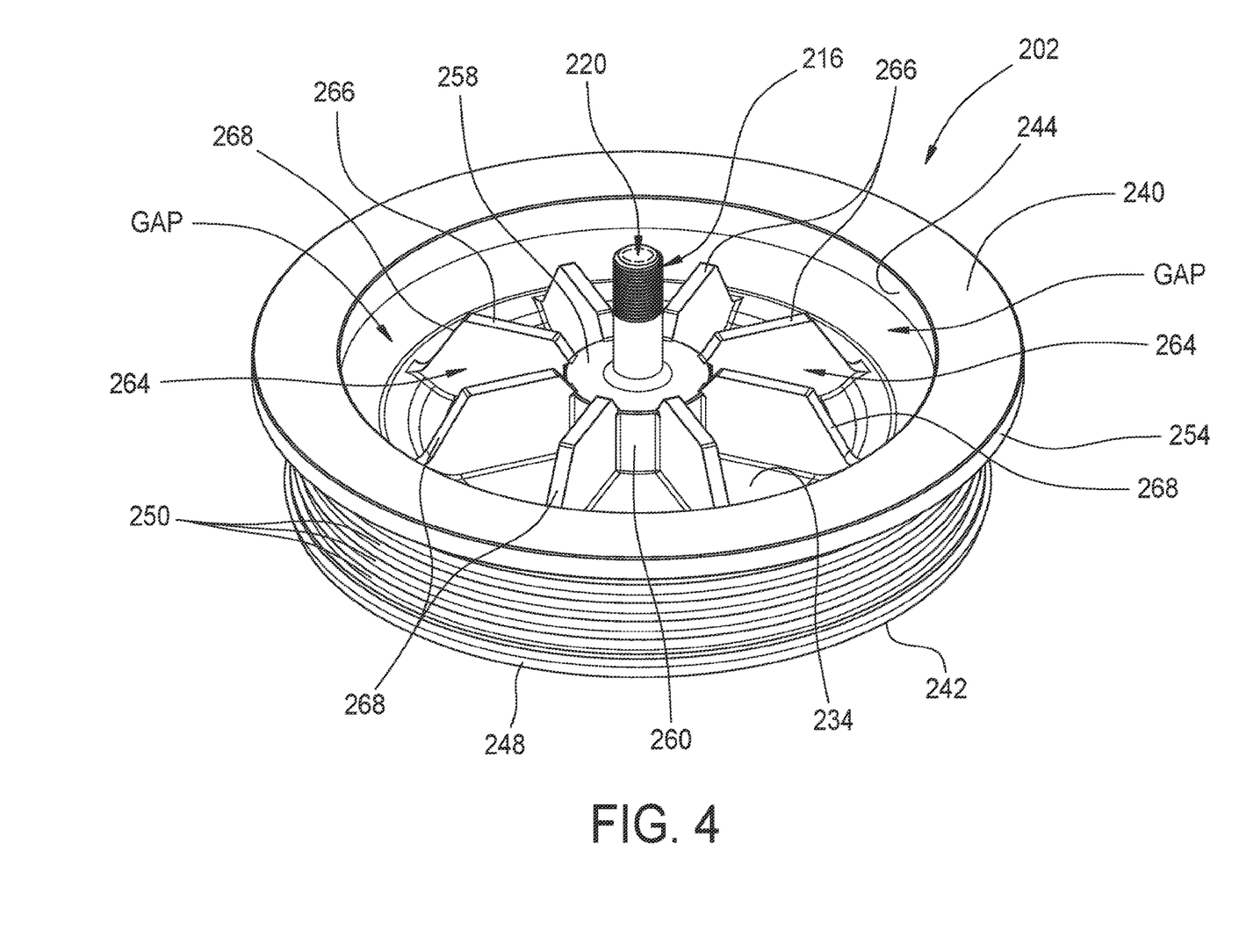
FIG. 4 is a top perspective view of one example of a gas spring end member in accordance with the subject matter of the present disclosure.
Figure 5:
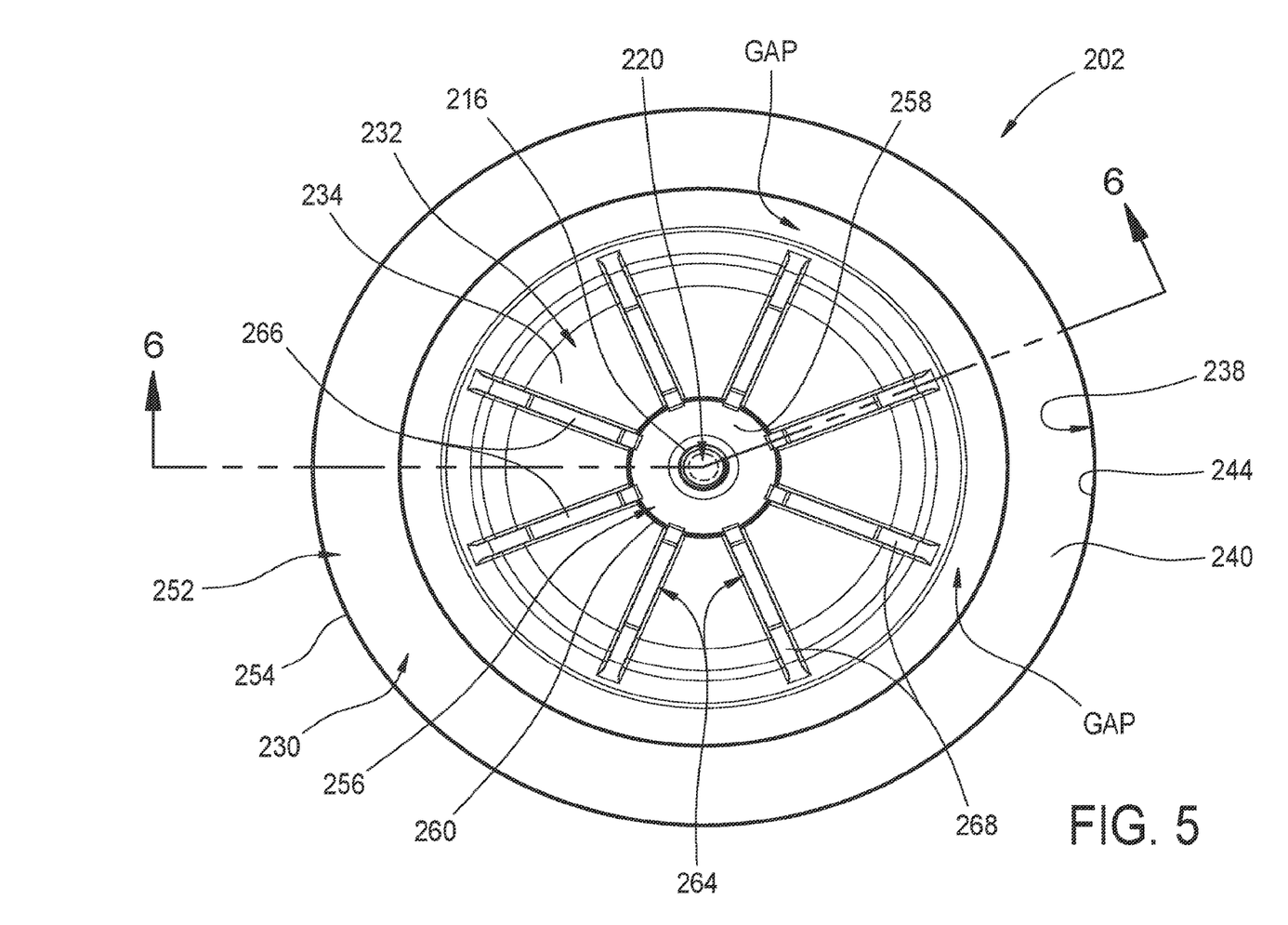
FIG. 5 is a top plan view of the exemplary gas spring end member in FIG. 4.

End member 204 is shown in FIGS. 2 and 3 as being of a type commonly referred to as a piston (or a roll-off piston) that has an outer surface 224 that abuttingly engages flexible spring member 206 such that a rolling lobe 226 is formed therealong. As gas spring assembly 200 is displaced between extended and collapsed conditions, rolling lobe 226 is displaced along outer surface 224 in a conventional manner. As indicated above, it will be appreciated that end 210 of flexible spring member 206 can be secured on or along end member 204 in any manner suitable for forming a substantially fluid-tight seal and/or connection therebetween. In the exemplary arrangement shown in FIG. 3, end 210 of flexible spring member 206 is disposed on or along end member 204. A retaining ring 228 can be positioned coextensively with end member 204, and end 210 can extend coextensively with and radially between the retaining ring and the end member. In such case, retaining ring 228 can compressively engage end 210 of the flexible spring member in abutting engagement with end member 204 such that a substantially fluid-tight seal and/or connection is formed therebetween. It will be appreciated, however, that other configurations and/or arrangements for connecting end 210 of flexible spring member 206 on or along end member 204 can alternately be used without departing from the subject matter of the present disclosure.

End member 202 can include any suitable number of one or more walls and/or wall portions, and can be formed from any suitable material or combination of materials. As a non-limiting example, end member 202 can include an end member wall 230 that is at least partially formed from a polymeric material, such as a fiber-reinforced polypropylene, a fiber-reinforced polyamide, or an unreinforced (i.e., relatively high-strength) thermoplastic (e.g., polyester, polyethylene, polyamide, polyether or any combination thereof), for example. In some cases, end member wall 230 can be substantially-entirely formed from such a polymeric material or combination of polymeric materials.

End member wall 230 of end member 202 includes an end wall portion 232 oriented transverse to axis AX with an end surface portion 234 facing in one axial direction and an end surface portion 236 facing in the opposing axial direction. In an assembled condition, end surface portion 236 can at least partially define spring chamber 212 with end surface portion 234 facing outward, such as toward upper structural component USC, for example. End member wall 230 can also include an outer wall portion 238 disposed radially outward of the end wall portion. Outer wall portion 238 can extend peripherally around axis AX and can be dimensioned to receivingly engage end 208 of flexible spring member 206, as discussed above. As such, outer wall portion 238 can extend axially between an end surface portion 240 and an end surface portion 242 facing opposite end surface portion 240.

End wall portion 232 flows into or is otherwise integrally formed with outer wall portion 238 such that end wall portion 232 is axially offset from end surface portion 240. In such cases, outer wall portion 238 can include a side surface portion 244 facing radially inward between end surface portions 234 and 240. In some cases, end wall portion 232 can be axially offset from end surface portion 240 and end surface portion 242. In which case, outer wall portion 238 can also, optionally, include a side surface portion 246 facing radially inward and disposed axially between end surface portions 236 and 242. Outer wall portion 238 can also include a side surface portion 248 facing outwardly. In some cases, one or more annular grooves 250 can extend into outer wall portion 238 from along side surface portion 248, such as may abuttingly engage end 208 of flexible spring member 206 and aid in retention thereof on or along the end member. End member wall 230 can also, optionally, include a flange wall portion 252 that extends outward from along outer wall portion 238 to an outer peripheral edge 254 of end member 202.

End member wall 230 can also include an inner wall portion 256 that extends axially from along end wall portion 232 toward an end surface portion 258. Inner wall portion 256 is disposed inward of outer wall portion 238 and includes an outer surface portion 260 facing toward side surface portion 244. In some cases, inner wall portion 256 can also include an inner surface portion 262 that can, optionally, at least partially define transfer passage 220.

Figure 6:
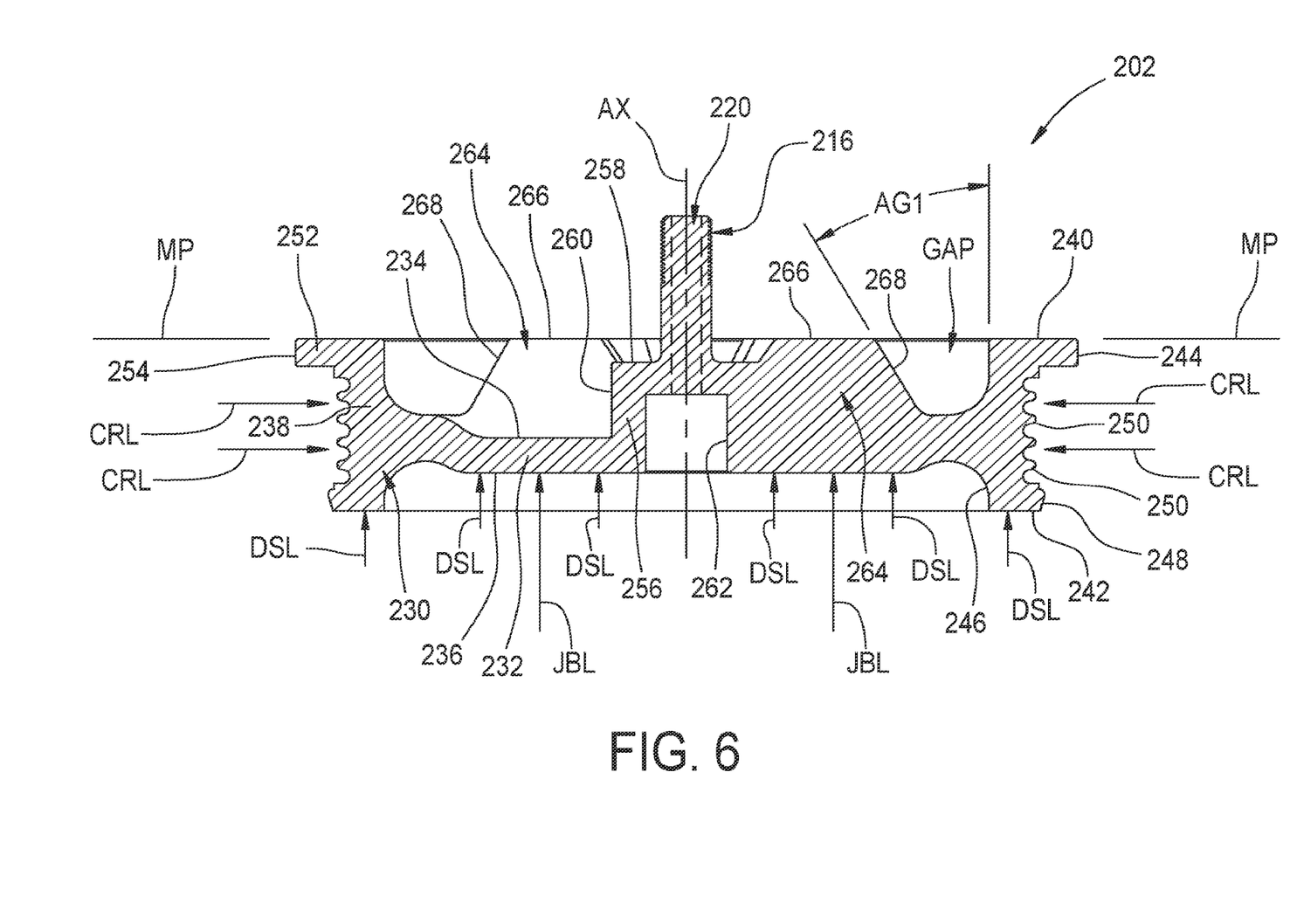
FIG. 6 cross-sectional side view of the gas spring end member in FIGS. 4 and 5 taken from along line 6-6 in FIG. 5.

End member wall 230 also includes a plurality of rib wall portions 264 that are disposed in spaced relation to one another around longitudinal axis AX. Rib wall portions 264 can extend axially from along end wall portion 232 toward an end surface portion 266. Additionally, or in the alternative, rib wall portions 264 can extend outwardly from along outer surface portion 260 of inner wall portion 256 toward an edge surface portion 268. Rib wall portions 264 have a dimension between outer surface portion 260 and edge surface portion 268 that is less than a corresponding dimension between outer surface portion 260 and side surface portion 244 such that a gap GAP is formed between outer surface portion 260 and edge surface portions 268 of the rib wall portions. In some cases, edge surface portions 268 can be disposed at an acute angle relative to side surface portion 244, as is represented in FIG. 6 by reference dimension AG1.

In some cases, one or more of end surface portions 266 can at least partially define a mounting plane MP of end member 202, such as may be suitable for abuttingly engaging an associated structural component, such as upper structural component USC, for example. Additionally, or in the alternative, end surface portion 240 of outer wall portion 238 can, optionally, at least partially define mounting plane MP. In a preferred arrangement, end surface portion 240 and end surface portions 266 are at least approximately disposed within mounting plane MP. In some cases, end surface portion 258 can be disposed in axially-spaced relation to end surface portions 266 such that end surface portion 258 of inner wall portion 256 is axially offset from mounting plane MP.

It will be appreciated that conventional end members that are otherwise dimensioned for use in gas spring assemblies of type and kind with which end member 202 is used will commonly include rib walls that extend radially outward and unitarily connect with the outer wall portion of the conventional end member. It will be recognized and understood that the areas of the outer wall of a conventional end member where the rib walls unitarily connect typically have increased radial stiffness relative to the areas of the outer wall of a conventional end member that are disposed peripherally between two adjacent rib walls. That is, in such conventional constructions, the outer wall typically has stiffness in the radially-inward direction that varies around the periphery of the outer wall in relation to proximity to the nearest rib walls with stiffness increasing as the outer wall approaches a rib wall.

As discussed above, gas spring assemblies are commonly assembled by swaging or other radially-inward deformation of a crimp ring, such as crimp ring 222, for example, around the exterior of the end of the flexible spring member to secure the end of the flexible spring member on the end member in a substantially fluid-tight manner. Due to the variability in radial stiffness discussed above, it will be appreciated that the radial deflection of conventional end members will vary peripherally around the conventional end member during and after a conventional swaging process. As such, the flexible spring member disposed between the crimp ring and a conventional end member will typically experience corresponding variations in compression peripherally around the flexible spring member. In some cases, such variations can be substantial and can, in some cases, lead to pressurized gas loss and/or reduced performance of the conventional gas spring assembly.

In accordance with the subject matter of the present disclosure, rib wall portions 264 are isolated, decoupled and/or otherwise disconnected from outer wall portion 238. In such an arrangement, the outer wall portion has a substantially uniform radial stiffness. As a result, radial deflection is substantially uniform around the periphery of outer wall portion 238 during otherwise conventional assembly processes in which a crimp ring (e.g., crimp ring 222) is swaged or otherwise radially-inwardly deformed to secure the end of the flexible spring member on or along end member 202, which is represented in FIG. 6 by arrows CRL representing radially-inward forces and/or loads associated with swaging or otherwise deforming crimp ring 222. That is, in accordance with the subject matter of the present disclosure, rib wall portions 264 are isolated, decoupled or otherwise disconnected from outer wall portion 238 such that the outer wall portion has a substantially uniform radial stiffness and an approximately uniform radial deflection during and after assembly.

In addition to crimp loads CRL, end members 202 also experience otherwise conventional spring forces and/or loads due to pressurized gas within spring chamber 212, as are represented in FIG. 6 by arrows DSL. It will be appreciated that the spring loads from the pressurized gas are substantially-evenly distributed along the surface portions of end member 202 that are in fluid communication with spring chamber 212. As such, it will be recognized and understood that pressurized gas acting on the surface portions oriented transverse to longitudinal axis AX function to generate the otherwise conventional axial forces of gas spring assembly 200, which are transferred toward mounting plane MP and into upper structural component USC through outer wall portion 238 as well as through the combination of end wall portion 232 and rib wall portions 264.

Additionally, end members 202 can experience other axially-applied forces and/or loads, such as are represented in FIG. 6 by arrows JBL, for example. Such axially-applied forces and/or loads can, for example, be generated by contact with an associated jounce bumper during a jounce condition of the gas spring assembly. Jounce bumper loads JBL (or other such axially-applied forces) can be transferred toward mounting plane MP and into upper structural component USC through the combination of end wall portion 232 and rib wall portions 264 while substantially isolating outer wall portion 238 from such jounce bumper or other axially-applied loads.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring end member dimensioned for securement to an associated flexible spring member, said gas spring end member comprising:
an end member wall with a longitudinal axis, said end member wall including:
an end wall portion oriented transverse to said longitudinal axis;
an outer wall portion disposed radially outward of said end wall portion, said outer wall portion extending peripherally about said longitudinal axis and dimensioned to receivingly engage the associated flexible spring member, said outer wall portion including a first end surface portion, a second end surface portion facing opposite said first end surface portion and an inner side surface portion facing radially inward; and,
a plurality of rib wall portions disposed in spaced relation to one another about said longitudinal axis with each of said plurality of rib wall portions projecting axially from said end wall portion toward a rib end surface portion oriented transverse to said longitudinal axis and with each of said plurality of rib wall portions including a rib edge surface portion spaced inward from said inner side surface portion of said outer wall portion such that a gap is formed therebetween.

2. A gas spring end member according to claim 1, wherein said rib end surface portion of two or more of said plurality of rib wall portions at least partially defines a mounting plane of said gas spring end member.

3. A gas spring end member according to claim 1, wherein each rib edge surface portion is oriented at an acute angle with respect to said inner side surface portion of said outer wall portion.

4. A gas spring end member according to claim 1, wherein said first end surface portion of said outer wall portion at least partially defines a mounting plane of said gas spring end member.

5. A gas spring end member according to claim 4, wherein said rib end surface portion of at least one of said plurality of rib wall portions is disposed within said mounting plane of said gas spring end member.

6. A gas spring end member according to claim 1, wherein said end wall portion flows into said outer wall portion in spaced relation to said first end surface portion of said outer wall portion.

7. A gas spring end member according to claim 1, wherein said end wall portion flows into said outer wall portion in spaced relation to said second end surface portion of said outer wall portion.

8. A gas spring end member according to claim 1, wherein said outer wall portion includes an outer side surface portion facing radially outward and dimensioned to receivingly engage the associated flexible spring member.

9. A gas spring end member according to claim 8, wherein said outer wall portion includes a plurality of annular grooves disposed along said outer side surface portion and dimensioned to abuttingly engage the associated flexible spring member.

10. A gas spring end member according to claim 8, wherein said outer side surface portion extends axially between first and second side surface portion ends with said end wall portion positioned along said outer wall portion between said first and second side surface portion ends.

11. A gas spring end member according to claim 1, wherein said end member wall includes a flange wall portion extending radially outward from along said outer wall portion to an outer peripheral edge.

12. A gas spring end member according to claim 11, wherein said flange wall portion at least partially defines a mounting plane of said gas spring end member.

13. A gas spring end member according to claim 1, wherein said end member wall includes an inner wall portion spaced inward of said outer wall portion.

14. A gas spring end member according to claim 13, wherein said inner wall portion includes an inner end surface portion disposed in spaced relation to said rib end surface portion of one or more of said plurality of rib wall portions.

15. A gas spring end member according to claim 13, wherein said plurality of rib wall portions extend radially outward from along said inner wall portion.

16. A gas spring end member according to claim 13 further comprising a securement structure disposed along said inner wall portion.

17. A gas spring end member according to claim 16, wherein said securement structure is a mounting stud extending axially from along said inner wall portion.

18. A gas spring end member according to claim 1, wherein said end member wall is formed substantially from a polymeric material.

19. A gas spring assembly comprising:
a flexible spring member extending peripherally about said longitudinal axis and longitudinally between opposing first and second ends such that a spring chamber is at least partially defined therebetween;
a gas spring end member at least partially received within said first end of said flexible spring member, said gas spring end member including an end member wall including:
an end wall portion oriented transverse to said longitudinal axis;
an outer wall portion disposed radially outward of said end wall portion, said outer wall portion extending peripherally about said longitudinal axis and dimensioned to receivingly engage said first end of said flexible spring member, said outer wall portion including a first end surface portion, a second end surface portion facing opposite said first end surface portion and an inner side surface portion facing radially inward; and
a plurality of rib wall portions disposed in spaced relation to one another about said longitudinal axis with each of said plurality of rib wall portions projecting axially from said end wall portion toward a rib end surface portion oriented transverse to said longitudinal axis and with each of said plurality of rib wall portions including a rib edge surface portion spaced inward from said inner side surface portion of said outer wall portion such that a gap is formed therebetween; and, a crimp ring positioned coextensively with said gas spring end member and extending peripherally therearound with said first end of said flexible spring member extending coextensively between said crimp ring and said gas spring end member, said crimp ring compressively engaging said first end of said flexible spring member with said gas spring end member such that a substantially fluid-tight connection is formed therebetween.

20. A suspension system comprising:
a pressurized gas system including a pressurized gas source and a control device; and,
at least one gas spring assembly according to claim 19 disposed in fluid communication with said pressurized gas source through said control device such that pressurized gas can be selectively transferred into and out of at least said spring chamber.

\* \* \* \* \*